United States Patent [19]

Ishida et al.

[11] Patent Number: 4,560,927
[45] Date of Patent: Dec. 24, 1985

[54] SPEED DETECTING APPARATUS

[75] Inventors: Hiroshi Ishida, Nishitama; Yoshiki Fujioka, Higashiyamato; Naoto Ota, Hino, all of Japan

[73] Assignee: Fanuc Ltd., Minamitsuru, Japan

[21] Appl. No.: 456,001
[22] PCT Filed: Apr. 23, 1982
[86] PCT No.: PCT/JP82/00136
  § 371 Date: Dec. 13, 1982
  § 102(e) Date: Dec. 13, 1982
[87] PCT Pub. No.: WO82/03692
  PCT Pub. Date: Oct. 28, 1982

[30] Foreign Application Priority Data

Apr. 22, 1981 [JP] Japan .................. 56-060964

[51] Int. Cl.$^4$ .............................................. G01P 3/46
[52] U.S. Cl. .................................. 324/166; 324/161; 324/163
[58] Field of Search ............... 324/160, 161, 163, 173, 324/175, 162, 166, 132

[56] References Cited

U.S. PATENT DOCUMENTS

| 2,979,623 | 4/1961 | Fowell . | |
|---|---|---|---|
| 3,811,091 | 4/1974 | Ha | 324/175 X |
| 3,819,268 | 6/1974 | Johnson | 324/173 |
| 3,882,402 | 5/1975 | Jensen . | |
| 3,902,116 | 8/1975 | Palmer . | |
| 3,934,200 | 1/1976 | Schoonover | 324/132 X |
| 4,228,396 | 10/1980 | Palombo | 324/163 |
| 4,341,994 | 7/1982 | Kawasaki | 324/132 |
| 4,408,128 | 10/1983 | Fujita | 324/132 X |

FOREIGN PATENT DOCUMENTS 2128567 10/1972 France .

OTHER PUBLICATIONS

Hirome Itoh: "Know How for Application of Optical Device"-Sharp Co.

Primary Examiner—Stanley T. Krawczewicz
Assistant Examiner—Jose M. Solis
Attorney, Agent, or Firm—Staas & Halsey

[57] ABSTRACT

A speed detecting apparatus having a detector (101) for generating two sine-wave signals (PA, PB) which are $\pi/2$ out of phase with each other and have a frequency proportional to the speed of rotation of a motor so that actual-speed voltages ($V_L$, $V_H$) can be produced which are proportional to the speed of rotation of the motor. The speed detecting apparatus includes a quadrupling circuit and a frequency-to-voltage converter 107. Also included is a first speed generator for generating the actual-speed voltage ($V_H$) in a high-speed range and a second speed generator which includes a four-phase rectangular signal generating circuit (106), a differentiating circuit (109), and a synchronous rectifier circuit (110) for producing the actual-speed voltage ($V_L$) in a low-speed range. The voltages generated by the first and second speed generators are selectively issued as an output depending on whether the motor rotates at a high speed or a low speed.

8 Claims, 6 Drawing Figures

SPEED DETECTING APPARATUS

BACKGROUND OF THE INVENTION

The present invention relates to a speed detecting apparatus, and more particularly to a speed detecting apparatus capable of detecting speeds ranging from low to high speeds with high accuracy.

DC and AC motors are controlled using data on the actual speeds of the motors fed back in a feedback loop. For example, in an AC motor control system in which the AC motor is driven by primary three-phase current commands generated by digital processing, the speed difference Δv between a commanded speed and an actual speed, and the actual speed n are supplied as inputs, and digital processing is carried out on the basis of Δv and n to determine the frequency and amplitude of the primary three-phase current commands. For example driving the spindle in a machine tool with an AC motor requires that the spindle be rotatable in a wide range of from low to high speeds. For accurate control, the speeds of rotation, both low and high, should be detected with precision.

According to a conventional speed detecting system, two-phase signals PA and PB which are π/2 out of phase with each other and have a frequency f proportional to the speed of rotation of the motor are generated, then the two-phase signals PA, PB are converter by a quadrupling circuit into signals having a frequency of 4f. Finally, a voltage (actual-speed voltage TSA) proportional to the speed of rotation is produced as an output of a frequency-to-voltage converter which serves to generate a voltage in proportion to the frequency 4f. With the prior system, however, as the pulse frequency becomes lower, the output voltage value from the frequency-to-voltage converter goes out of proportion to the frequency and is rapidly reduced. For this reason, the known system has not been suitable for the detection of speeds of AC motors which rotate at extremely low speeds.

SUMMARY OF THE INVENTION

With the foregoing in view, it is an object of the present invention to provide a speed detecting apparatus capable of precisely detecting the speed of rotation of a motor in a range of from low to high speed.

According to the present invention, there is disclosed a speed detecting apparatus having a detector for generating two sine-wave signals which are π/2 out of phase with each other and have a frequency proportional to the speed of rotation of a motor so that output voltages can be produced which depend on the speed of rotation of the motor through the use of the two sine-wave signals, thus detecting the speed. The speed detecting apparatus of the invention includes a frequency-to-voltage converter for converting the frequency of the sine-wave signals into a voltage and an inverter circuit for inverting the phases of the two-phase sine-wave signals to produce output signals. A synchronous rectifier circuit is supplied with the sine-wave signals directly or via a differentiating circuit to rectify the supplied signals in synchronism and combine them. A detector circuit detects whether the speed of rotation of the motor is greater or smaller than a predetermined value and generates switching signals. Analog switches deliver the output voltage produced by the frequency-to-voltage converter at high speeds and the output voltage produced by the synchronous rectifier circuit at low speeds in response to the switching signals from the detector circuit. With the present invention, the output voltage $V_H$ from the frequency-to-voltage converter and the output voltage $V_L$ from the synchronous rectifier circuit are selectively issued as an actual-speed voltage TSA depending on the speed of motor. This allows the actual-speed voltage TSA to be proportional to the number n of RPM in a range of low to high speeds so that the speed of motor can be detected precisely.

DESCRIPTION OF THE PREFERRED EMBODIMENT

Figure 1:
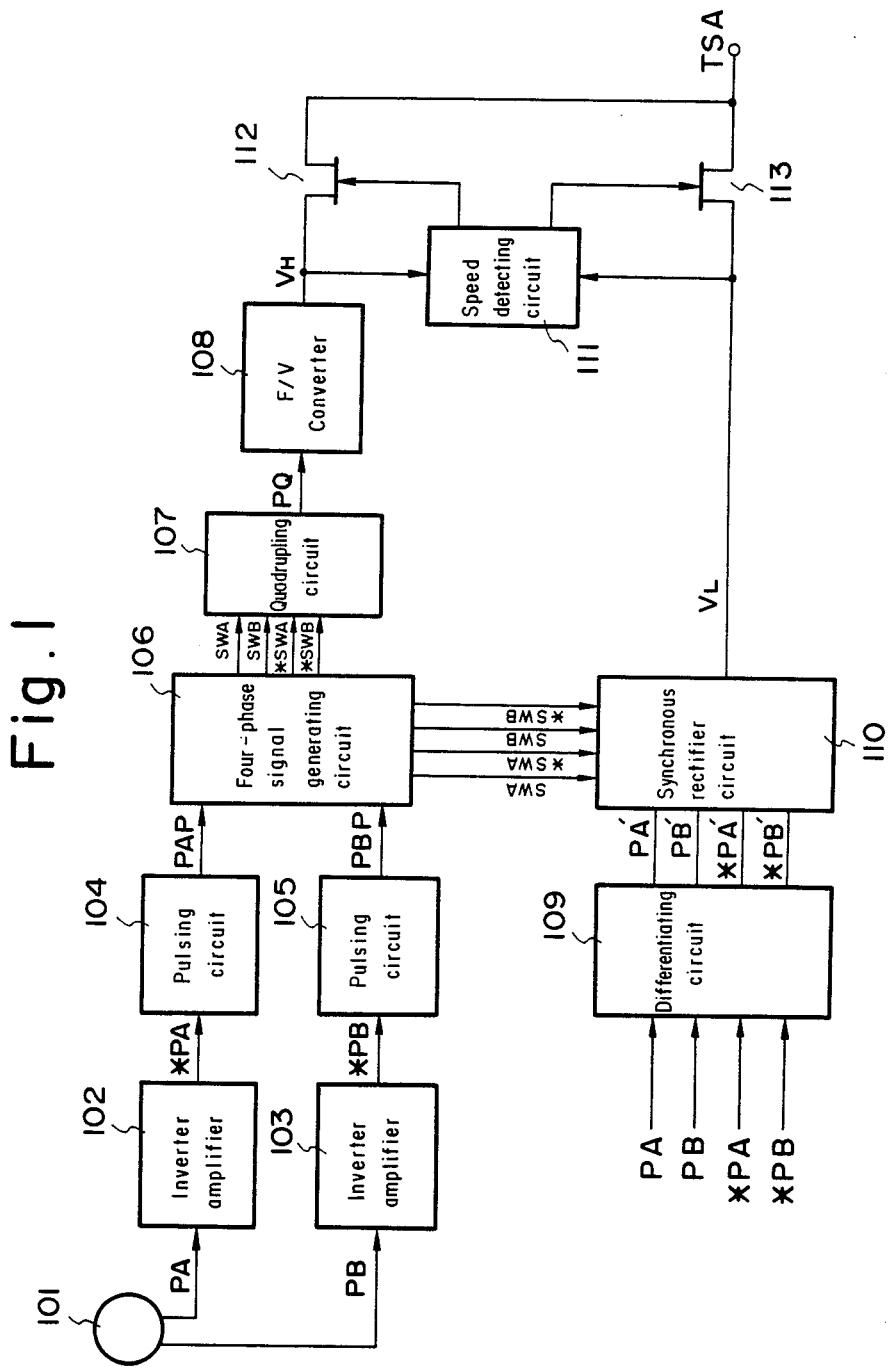
FIG. 1 is a block diagram of the present invention.
Figure 2:
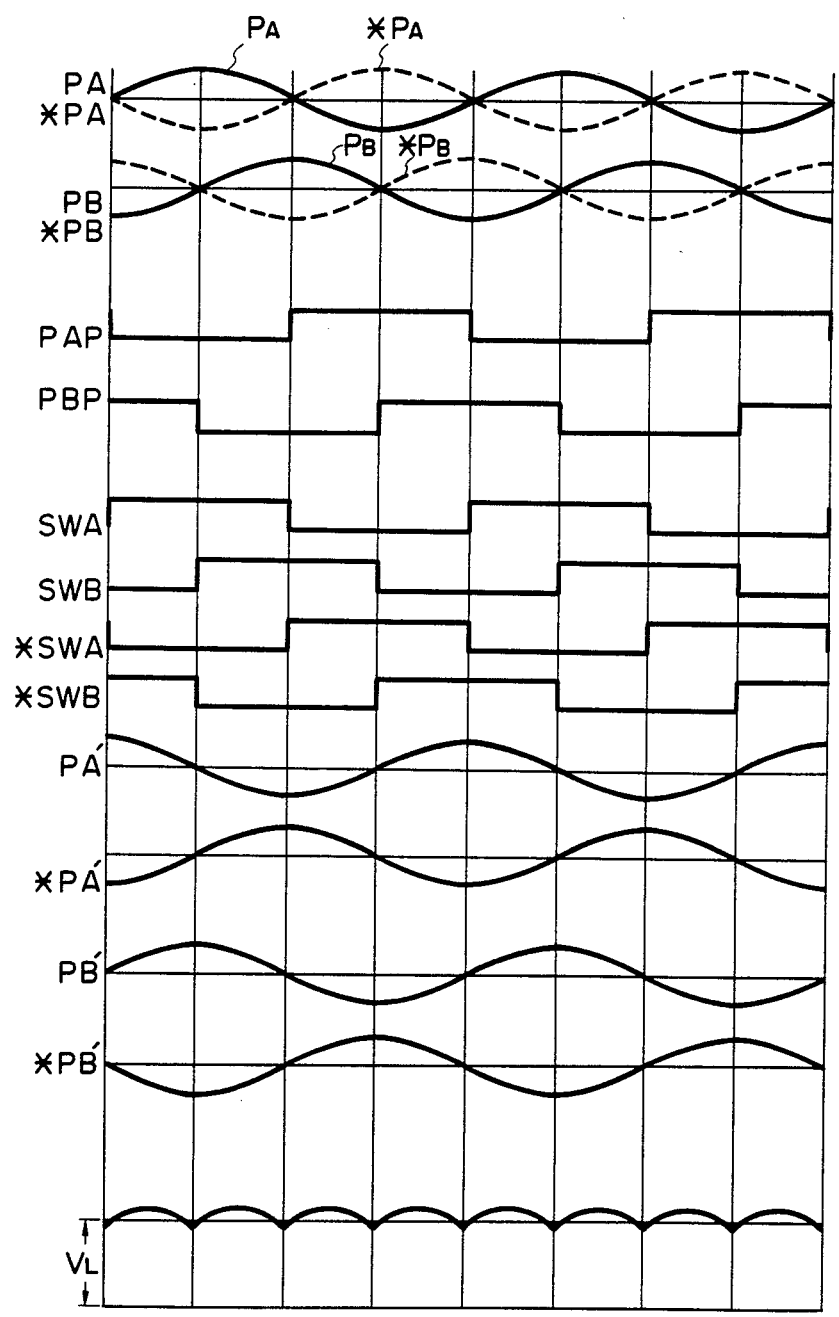
FIG. 2 is a diagram showing various signal waveforms.

The present invention will hereinafter be described in greater detail with reference to the accompanying drawings. Designated in FIG. 1 as 101 is a pulse generator such as a resolver, a magnetic sensor or the like for generating two sine-wave signals PA and PB (see FIG. 2) having a frequency which is proportional to the speed of rotation of a motor (not shown) and 90° out of phase with each other. Inverter amplifiers 102 and 103 serve to produce signals *PA, *PB that are 180° out of phase with the sine-wave signals PA and PB. Pulsing circuits 104 and 105 are supplied with the signals *PA and *PB as inputs and convert them into rectangular signals PAP and PBP. The pulsing circuits may be slicer circuits, for instance, having a slice level of zero volts. Designated as 106 is a four-phase signal generating circuit for producing as outputs four-phase rectangular signals SWA, SWB, *SWA and *SWB using the rectangular signals PAP and PBP. A quadrupling circuit 107 produces a signal PQ having a fourfold increase in frequency over DA and DB by utilizing positive-going edges of the four-phase signals SWA - *SWB. Block 108 is a frequency-to-voltage converter for producing an output voltage $V_H$ which becomes proportional to the frequency of a train of input pulses when the frequency is greater than or equal to a threshold value.

Figure 3:
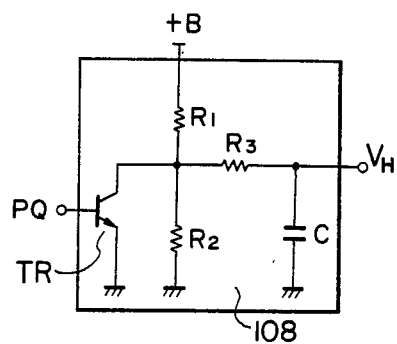
FIG. 3 is a circuit diagram of a frequency-to-voltage converter.
Figure 5:
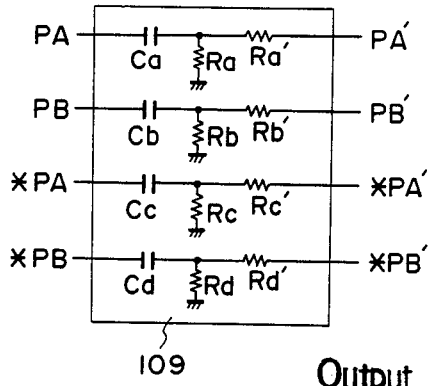
FIG. 5 is a circuit diagram of a differentiating circuit.

As shown in FIG. 3, the frequency-to-voltage converter 108 includes a transistor TR which can be turned on and off by the quadrupled frequency signal PQ, resistors $R_1$–$R_3$, and a capacitor C. The resistors $R_1$, $R_2$ and $R_3$ and the capacitor C comprise an integrating circuit. A differentiating circuit 109 serves to differentiate the sine-wave signals PA, PB, *PA and *PB thereby generating differentiated output signals PA', PB', *PA' and *PB'. As illustrated in FIG. 5, the differentiating circuit 109 comprises capacitors Ca–Cd and resistors Ra–Rd and Ra'–Rd' differentiating circuit is disclosed in U.S. Pat. No. 3,811,091. The differentiated signals PA', PB', *PA' and *PB' having amplitudes proportional to the speed of rotation of the motor are produced by differentiating the sine-wave signals PA, PB, *PA and *PB.

Figure 4:
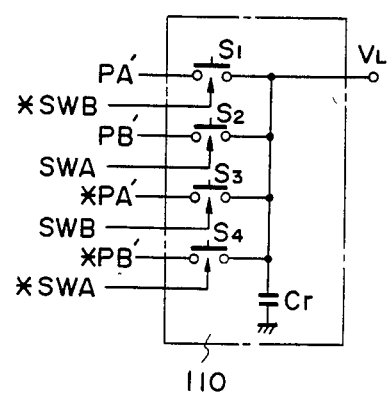
FIG. 4 is a circuit diagram of a synchronous rectifier circuit.

A synchronous rectifier circuit 110 (FIG. 1) is supplied with the differentiated signals PA', PB', *PA' and *PB' from the differentiating circuit 109 and the rectangular signals SWA, SWB, *SWA and *SWB (FIG. 2) from the four-phase signal generator circuit 106 to rectify the differentiated signals PA'–*PB' in synchronism with the rectangular signals SWA, SWB, *SWA and *SWB, thereby producing an actual-speed signal $V_L$ as a output. FIG. 4 shows the synchronous rectifier circuit 110. As is apparent from FIG. 4, the synchronous rectifier circuit 110 comprises electronic switches $S_1$, $S_2$, $S_3$ and $S_4$ which can be opened and closed by the rectangular signals SWA, SWB, *SWA and *SWB. The switches have input terminals fed with the differentiated signals PA', PB', *PA' and *PB' and output terminals connected in common. A capacitor Cr is connected between the interconnected output terminals and ground. The interconnected output terminals may be coupled to an input of an analog adder with its output joined to the capacitor Cr.

A speed detecting circuit 111 is supplied with the output voltage $V_H$ from the frequency-to-voltage converter (F/V converter) 108 and the output voltage $V_L$ from the synchronous rectifier circuit 110, or one of the output voltages, for determining whether the actual speed of the motor is in a high-speed or low-speed range. When the actual speed is in the high-speed range, an analog switch (for example, FET 112) is rendered conductive to issue the voltage $V_H$ as the actual-speed voltage TSA. When the actual speed is in the low-speed range, an analog switch (for example, an FET 113) is rendered conductive to issue the voltage $V_L$ as the actual-speed voltage TSA.

Figure 6:
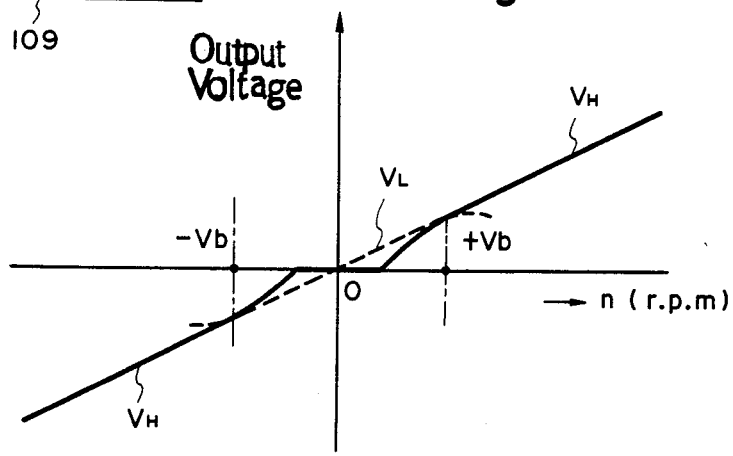
FIG. 6 is a diagram explaining an operation of the present invention.

The voltages $V_H$ and $V_L$ are selectively delivered for the reasons that, as shown in FIG. 6, the output voltage $V_H$ from the F/V converter 108 is proportional to the number n of RPM of the motor in the high-speed range as indicated by the solid line, and the output voltage $V_L$ from the synchronous rectifier circuit 110 is proportional to the number n of RPM of the motor in the low-speed range as indicated by the dotted line. Accordingly, by setting up a speed range ±Vb in which the voltages $V_H$ and $V_L$ are smoothly joined as an intermediate range between the high-speed and low-speed ranges, the actual-speed voltage TSA can be kept substantially in proportion to the rotational speed n throughout the entire range.

According to the present invention, as described above, the actual-speed voltage TSA is obtained by selecting the output voltage $V_H$ from the frequency-to-voltage converter and the output voltage $V_L$ from the synchronous rectifier circuit depending on the speed of the motor. The actual-speed voltage TSA can be kept proportional to the number n of RPM through a wide speed range of from low to high speeds. The present invention is therefore suitable for use in motor speed control.

What is claimed is:

1. A speed detecting apparatus for detecting the speed of a motor, comprising:
    a detector for generating two detected sine-wave signals which are $\pi/2$ out of phase with each other, both having a frequency which is proportional to the speed of rotation of the motor;
    a frequency-to-voltage converter for converting the frequency of the detected sine-wave signals into a voltage;
    an inverter circuit, operatively connected to said detector and said frequency-to-voltage converter, for inverting the sine-wave signals, thereby producing inverted sine-wave signals;
    low velocity signal generating means, operatively connected to said detector and said inverter, for generating a low velocity signal, comprising a synchronous rectifier circuit, operatively connected to said detector and said inverter, for rectifying and combining the detected and inverted sine-wave signals in synchronism;
    a speed detector circuit, operatively connected to said frequency-to-voltage converter and said synchronous rectifier circuit, for comparing the speed of rotation of the motor with a predetermined value and generating switching signals; and
    analog switches, operatively connected to said speed detector circuit, said frequency-to-voltage converter and said synchronous rectifier circuit, for delivering the voltage produced by said frequency-to-voltage converter when the speed of the motor is higher than the predetermined value and the rectified voltage produced by said synchronous rectifier circuit when the speed of the motor is lower than the predetermined value, in response to the switching signals from said detector circuit.

2. A speed detecting apparatus according to claim 1, wherein said frequency-to-voltage converter comprises an integrating circuit having resistors and a capacitor.

3. A speed detecting apparatus according to claim 1, further comprising a four-phase rectangular signal generator circuit, operatively connected to said inverter circuit, said frequency-to-voltage converter and said synchronous rectifier circuit, for generating four-phase rectangular signals from the inverted sine-wave signals, and
wherein said low velocity signal generating means further comprises a differentiating circuit, operatively connected to said detector, said inverter circuit and said synchronous rectifier circuit, for generating four-phase differentiated signals by differentiating the detected and inverted sine-wave signals, said synchronous rectifier circuit rectifying the four-phase differentiated signals in synchronism with said four-phase rectangular signals.

4. A speed detecting apparatus according to claim 1, further comprising a differentiating circuit, operatively connected to said detector, said inverter circuit and said synchronous rectifier circuit, for generating four-phase differentiated signals by differentiating the detected and inverted sine-wave signals, said synchronous rectifier circuit rectifying the four-phase differentiated signals.

5. A speed detecting apparatus according to claim 1, wherein said frequency-to-voltage converter comprises an integrating circuit having resistors and a capacitor, and said apparatus further comprises a four-phase rectangular signal generator circuit, operatively connected to said inverter circuit, said frequency-to-voltage converter and said synchronous rectifier circuit, for generating four-phase rectangular signals from the inverted sine-wave signals, said synchronous rectifier circuit rectifying the four-phase differentiated signals in synchronism with said four-phase rectangular signals.

6. A speed detecting apparatus for detecting the speed of the motor, comprising:
    detector means for generating sine-wave signals, $\pi/2$ out of phase with each other, having a frequency proportional to the speed of the motor;

frequency-to-voltage converter means, operatively connected to said detector, for converting the frequency of the sine-wave signals into a voltage;

low velocity signal means, operatively connected to said detector, for outputting a low velocity signal by rectifying and combining the sine-wave signals; and switching means, operatively connected to said frequency-to-voltage converter means and said low velocity signal means, for supplying one among the low velocity signal and the converted voltage in dependence upon the speed of the motor.

7. A speed detecting apparatus according to claim 6, wherein the motor is an alternating current motor.

8. A speed detecting apparatus according to claim 6, wherein said switching means comprises:

speed detecting means, operatively connected to said frequency-to-voltage converter means and said low velocity signal means, for determining which of the low velocity signal and the converted voltage to supply;

a first transistor, operatively connected to said frequency-to-voltage converter means and said speed detecting means, for supplying the converted voltage in accordance with the determination made by said speed detecting means; and a second transistor, operatively connected to said low velocity signal means and said speed detecting means, for supplying the low velocity signal in accordance with the determination made by said speed detecting means.

* * * * *

UNITED STATES PATENT AND TRADEMARK OFFICE
CERTIFICATE OF CORRECTION

PATENT NO. : 4,560,927

DATED : December 24, 1985

INVENTOR(S) : Ishida et al.

It is certified that error appears in the above-identified patent and that said Letters Patent is hereby corrected as shown below:

FRONT PAGE: [22] PCT FILED "April 23, 1982" should be --April 22, 1982--.

Signed and Sealed this

Fifteenth Day of April 1986

[SEAL]

Attest:

DONALD J. QUIGG

Attesting Officer

Commissioner of Patents and Trademarks